Patented Sept. 29, 1936

2,055,746

UNITED STATES PATENT OFFICE

2,055,746

SULPHUR DYE PREPARATIONS

Walter Hagge, Dessau in Anhalt, Germany, assignor to General Aniline Works, Inc., New York, N. Y., a corporation of Delaware No Drawing. Application December 22, 1933, Serial No. 703,667. In Germany December 24, 1932

5 Claims. (Cl. 260—17)

Various proposals have been made in respect of the manufacture of sulphur dyes soluble in water; for instance, by evaporating the acid dye (disulphide) with sodium sulphide (Lange, Schwefelfarbstoffe, Auflage 1925, page 179). The dye has also been brought in a similar manner into a fluid or pasty form (Anmeldung F. 19 945; Friedländer VIII, 324; see also Leipziger Monatshefte für Textilindustrie 1905, page 207, Lehnes Färberzeitung 1905, page 234; Anmeldung A. 14 985; Friedländer IX, 478). Such fluid commercial dyes, however, can be obtained only in a low degree of concentration in comparison with the dry dye since otherwise segregation and crystallization occur. A further disadvantage of these dyes, soluble in water, is that in making the dye-bath it is necessary to add a certain quantity of alkali metal sulphide, a condition which is unfavorable, particularly in connection with export trade. Attempts have therefore been made to produce sulphur dyes which yield practicable dye-baths without further addition of alkali metal sulphide. Useful results have been obtained only in the case of black sulphur dyes, such as are obtained from dinitrophenol or mixtures of dinitro- and trinitrophenol. No useful dye preparations containing the quantity of sodium sulphide requisite for the dye bath have hitherto been obtainable in the case of colored sulphur dyes because during the concentration and drying of the dye containing such a quantity of sodium sulphide, products of decomposition and degradation are produced.

According to the present invention, useful dye preparations of high concentration and soluble in water are obtained from all sulphur dyes by converting them into the reduced form by means of a quantity of reducing agent sufficient to provide after reduction the quantity of sodium sulphide requisite for the dye-bath, under such conditions that degradation or decomposition by the setting up of hydrolysis (free alkali) is avoided during the operation. As is known, only the reduced or leuco-form of sulphur dyes has affinity for the fiber, so the preparations made in accordance with this invention are already in a form suitable for use. They have the advantage that they are soluble in water at the ordinary temperature and have an affinity for the fiber in the dye-bath at room temperature without further addition of alkali metal sulphide. Correspondingly with the properties of the individual dyes the best dyeing may be obtainable at the ordinary temperature or at a raised temperature. For the dye-house, these dye preparations constitute a considerable progress.

The conversion of the sulphur dyes into a concentrated reduced form containing sodium sulphide can be attained by avoiding hydrolysis if one of the following conditions is observed:—

(1) The use of reducing agents by which the hydrolysis is suppressed, for example NaSH or a mixture of $Na_2S$ and NaSH.

(2) The use of a temperature for the reduction which is below the boiling point of the reducing bath.

(3) The use of a reducing bath of such concentration that its content of alkali metal sulfide is not less than about 30 per cent. (calculated on a molecular weight of 78).

In particular cases, such as in the case of sulphurized baked dyes (obtained by melting a mixture of an aromatic base with sulphur), it is possible to conduct the leaching of the sulphur melt, that is to say, the conversion into the form soluble in alkali metal sulphide, with caustic soda; without isolation of the sulphur dye obtained it is changed into the reduced form containing sodium sulphide by a further addition of $Na_2S$, or NaSH.

From the dye bath made with the dye preparations and of the usual concentration, dyeings are obtained which have properties of fastness equal to those which can be obtained by known methods.

The following examples illustrate the invention:—

*Example 1.*—The dye obtained by treating with an alkali metal polysulphide the leucoindophenol-3-methyl-4-amino-4'-oxydiphenylamine is precipitated in the usual manner and pressed; 100 kilos of the dye are introduced, at 50° C., in the form of a press-cake, into 370 kilos of sodium hydrosulphide solution of 65 per cent. strength. When the reduction is finished the whole is heated to 70° C. and the dye paste dried on rollers or in a vacuum at 125 to 135° C. The highly concentrated dye preparation thus obtained dissolves completely in water, even at the ordinary temperature, and dyes the fiber, even at room temperature, without further addition of alkali sulphide. The dyeing produced is a vivid blue of good fastness to light and washing.

*Example 2.*—The dye press-cake obtained from the condensation product from diphenylamine-2-carboxylic acid and nitrosophenol by treatment with an alkali metal polysulphide, is dried. 100 kilos of the dried dye are introduced, at ordinary temperature, into 340 kilos of sodium hydrosulphide solution of 30 per cent. strength. When the reduction is complete, the mass is stirred for an hour at 50° C. and the dye paste dried as described in Example 1. The dyeing obtained with this preparation has the properties described in Example 1.

*Example 3*.—The dye obtained from trinitrophenol by boiling under reflux with an aqueous solution of sodium polysulphide is precipitated by means of air and separated by filtration. The filter-cake, corresponding with 100 kilos of dry dye, and containing about 25 per cent. of water, is stirred at 50° C. with 180 kilos of sodium hydrosulphide of 40 per cent. strength, and 40 kilos of calcined sodium sulphide are then introduced, whereupon the mass is heated to 75° C. The working up and properties of the dye are as described in Example 1. The dye dyes cotton violet-black tints, which are somewhat developed in the boiling bath.

*Example 4*.—The yellow sulphur dye obtained from 50 kilos of meta-toluylenediamine by introducing into 100 kilos of sulphur and finally heating to about 190° C. is isolated in known manner. The dried dye is then stirred with crystallized sodium sulphide at 80° C. and worked up as described in Example 1. 100 kilos of dye need about 400 kilos of crystallized sodium sulphide.

The dye preparation obtained dissolves freely in water and dyes cotton in the dye-bath thus prepared yellow tints of good fastness.

*Example 5*.—100 kilos of the crude mass obtained by heating slowly 120 parts of meta-toluylenediamine and 100 parts of para-phenylenediamine, with 500 parts of sulphur to 200° C. and then raising the temperature in 4 hours to 240° C. are treated with 200 kilos of caustic soda lye of 35° Bé. and, after addition of 157 kilos of crystallized sodium sulphide, the whole is dried on rollers under vacuum or in a vacuum chest. The dye obtained has the properties described in Example 4. It dyes cotton olive tints.

What I claim is:—

1. The process for manufacturing sulphur dye preparations containing the quantity of alkali metal sulphide requisite for the dye-bath, which comprises adding to the aqueous solution of the sulphur dye the required amount of alkali metal sulphide and evaporating the water without hydrolysis of the alkali metal sulphide.

2. The process for manufacturing water-soluble sulphur dye preparations containing the quantity of alkali metal sulphide requisite for the dye-bath, which comprises treating the sulphur dye in the presence of water with a reducing agent of the general formula $$X-S-\text{alkali metal}$$

wherein X is hydrogen or an alkali metal, and evaporating the water from the preparation in the presence of the alkali metal sulphide required for preparing the dye-bath, without hydrolysis of the said reducing agent.

3. The process for manufacturing water-soluble sulphur dye preparations containing the quantity of alkali metal sulphide requisite for the dye-bath, which comprises treating the sulphur dye in the presence of water with a reducing agent of the general formula $$X-S-\text{alkali metal}$$

wherein X is hydrogen or an alkali metal, and evaporating the water from the preparation in the presence of the alkali metal sulphide required for preparing the dye-bath, at a temperature below the normal boiling point of the reducing bath.

4. The process for manufacturing water-soluble sulphur dye preparations containing the quantity of alkali metal sulphide requisite for the dye-bath, which comprises treating the sulphur dye in the presence of water with a reducing agent of the general formula $$X-S-\text{alkali metal}$$

wherein X is hydrogen or an alkali metal and evaporating the water from the dye solution in the presence of the alkali metal sulphide required for preparing the dye-bath, the said dye solution having a content of alkali metal sulphide of at least 30 per cent. calculated on anhydrous sulphide.

5. The process for manufacturing water-soluble sulphur dye preparations containing the quantity of alkali metal sulphide requisite for the dye-bath, which comprises treating the sulphur dye in the presence of water with an alkali metal hydrosulphide and evaporating the water from the dye solution in the presence of the alkali metal hydrosulphide required for preparing the dye-bath.

WALTER HAGGE.